July 4, 1944. S. SCHNELL Re. 22,513

SINGLE ANCHOR MOUNTING CONSTRUCTION FOR BRAKE SHOES

Original Filed Dec. 22, 1941

INVENTOR
STEVE SCHNELL

BY

ATTORNEY

Reissued July 4, 1944

Re. 22,513

UNITED STATES PATENT OFFICE 22,513

SINGLE ANCHOR MOUNTING CONSTRUCTION FOR BRAKE SHOES

Steve Schnell, Kirkwood, Mo., assignor to Wagner Electric Corporation, St. Louis, Mo., a corporation of Delaware Original No. 2,325,998, dated August 3, 1943, Serial No. 423,897, December 22, 1941. Application for reissue January 7, 1944, Serial No. 517,448

15 Claims. (Cl. 188—79.5)

My invention relates to brakes and more particularly to an improved single anchor mounting construction for two shoes of an internal brake.

One of the objects of my invention is to provide an improved mounting for two brake shoes which embodies only a single anchor pin and permits both shoes to be self-centering under all conditions during braking.

Another object of my invention is to provide a single anchor pin mounting for two shoes which will relieve toe grab of either shoe when it tends to occur.

Still another object of my invention is to provide an improved single anchor mounting for the heel ends of two shoes which will be simple in construction, economical to manufacture and result in efficient braking action.

Figure 1:
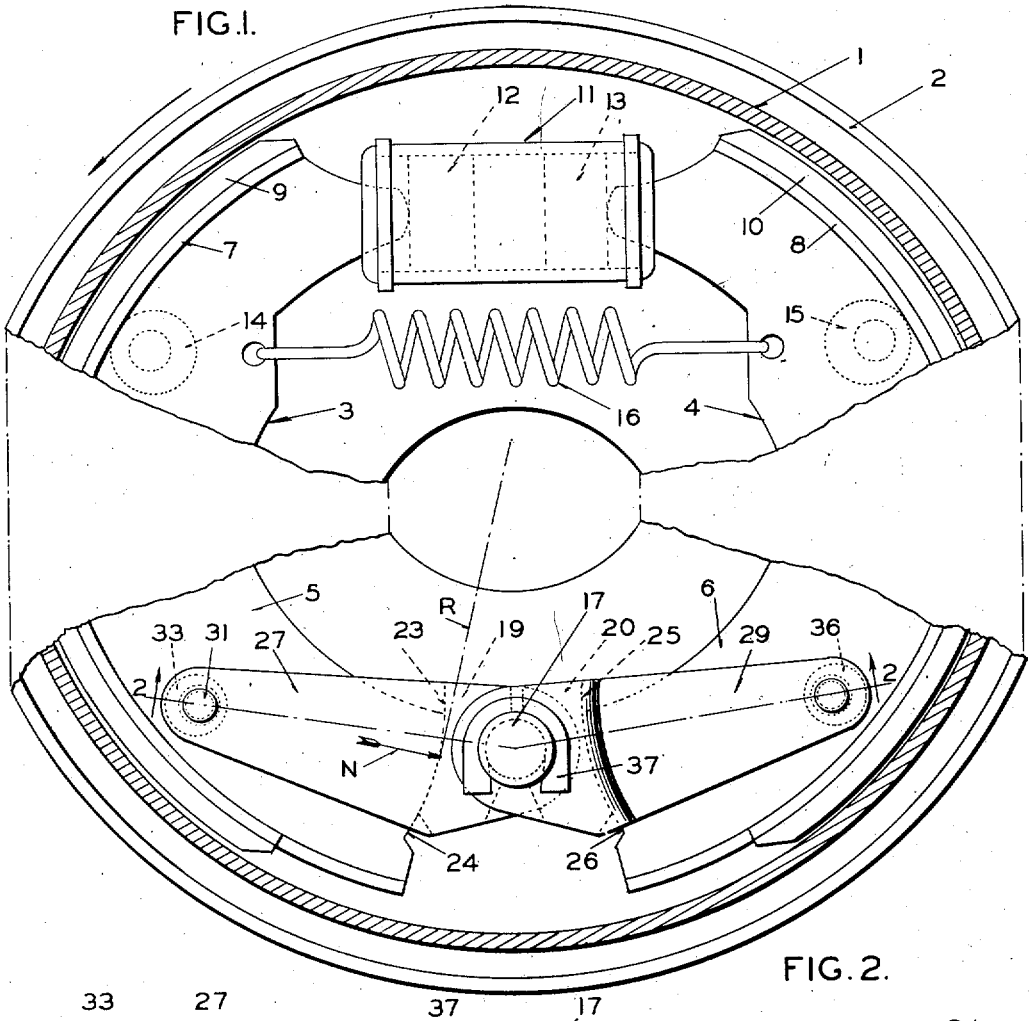
Figure 2:
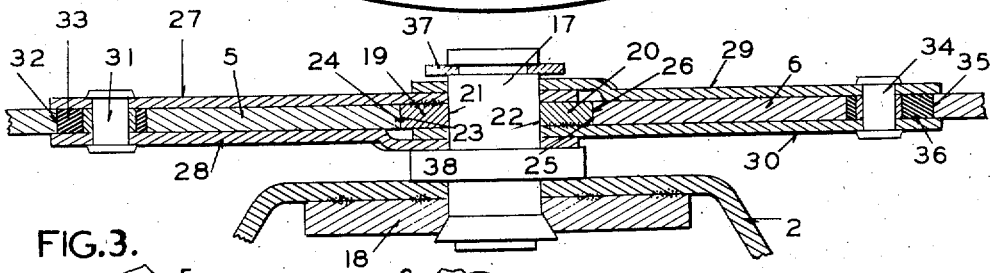
Figure 3:
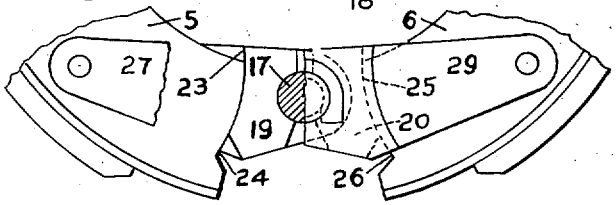

Other objects of my invention will become apparent from the following description taken in connection with the accompanying drawing in which Figure 1 is a side view of a two shoe brake assembly having a mounting for the shoes embodying my invention; Figure 2 is a sectional view taken on the line 2—2 of Figure 1; and Figure 3 is a view with parts broken away to show the curved abutment surfaces.

Referring in detail to Figures 1 and 2, the numeral 1 indicates the usual drum of the brake which is secured to a rotating member on a vehicle, and 2 the fixed backing plate or support which closes the open side of the drum. Within the drum are positioned two brake shoes 3 and 4 comprising webs 5 and 6, lining carrying flanges 7 and 8, and linings 9 and 10. The toe ends of the shoes are adapted to be actuated into engagement with the drum by any suitable means, that shown comprising a hydraulic fluid motor 11 embodying oppositely movable pistons 12 and 13, said pistons being moved by hydraulic pressure from a suitable source. The shoes are held in retracted position against stops 14 and 15 by a retracting spring 16 connected between the shoes.

The heel ends of the shoes are mounted upon the backing plate by my improved mounting means. This mounting means comprises a single anchor pin 17 secured to the support 2 which is reinforced at this point by a plate 18 (see Figure 2). Associated with the anchor pin are two abutment members 19 and 20 positioned on opposite sides of the anchor pin and lying in the same plane. The abutment member 19 is formed with a partial circle recess 21 for engaging the surface of the pin on one side of its axis and the abutment member 20 is provided with a partial recess 22 for engaging the surface of the pin on the other side of its axis. Each abutment member contacts less than 180 degrees of the anchor pin surface. Thus it is seen that both abutment members are capable of rotative movement on the pin and about its axis. The abutment member 19 is provided with a curved surface 23 and the web of the heel end of shoe 3 has a similar curved surface 24 for cooperation with said curved surface 23. In a like manner the abutment member 20 has a curved surface 25 and cooperating therewith is a curved surface 26 on the web at the heel end of shoe 4.

Associated with the abutment member 19 and shoe 3 are two links 27 and 28 positioned on opposite sides of web 5 of said shoe. The abutment member 20 and shoe 4 also have associated therewith two links 29 and 30 positioned on opposite sides of the web of said shoe. The links 27 and 29, which lie on the same side of the webs of the shoes, are in overlapping relation with the link 27 on the inside adjacent the abutment member 19. The links 29 and 30 on the opposite sides of the webs of the shoes are also in overlapping relation with the link 30 adjacent the abutment member 20. All the links are provided with suitable openings for receiving the anchor pin. The link 27 is secured to the abutment member 19 in any suitable manner, such, for example, by welding, and link 30 is secured in a like manner to the abutment member 20. Thus the abutment member 19 is moved with link 27 whenever this link is rotated on the anchor pin and abutment member 20 is rotated with link 30 whenever this link is rotated on the anchor pin.

The outer ends of links 27 and 28 are pivoted to web 5 of shoe 3 by a pin 31 passing through an oversized opening 32 in said web. Surrounding the pin is a rubber washer 33 of an external diameter to fit the opening 32. This washer, in its normal shape, has a uniform radial thickness but the opening 32 in the web of the shoe is so positioned with respect to pin 31 that when the shoe, the abutment member 19 and the links are assembled, the washer will be compressed so as to establish a force which causes the curved surface 24 on the end of shoe 3 to be held in pressure engagement with curved surface 25 of the abutment member 19. This pressure engagement establishes a frictional resistance to relative sliding movement between the curved surfaces. The curved surfaces have the same radius of curvature and the common axis thereof coincides with the axis of pin 31 which pivotally connects the links to the web of the shoe.

Links 29 and 30 are connected to web 6 of shoe 4 in the same manner as that described with respect to the connection of links 27 and 28 to shoe 3. This construction comprises a pivot pin 34 passing through the oversized opening 35 in web 6 of shoe 4 and the rubber washer 36 positioned in said opening 35 and surrounding pin 34, said washer being compressed on one side when shoe 4, abutment member 20 and links 29 and 30 are assembled in operative relation. The curved surfaces 25 and 26 have their axes coinciding with the axis of pin 34.

All of the links and the abutment members 19 and 20 are maintained on the anchor pin by a C-washer 37, said anchor pin also having a flange 38 for holding the assembly away from the support 2.

If the drum is rotating in the direction of the arrow, brake shoe 3 will act as a forward shoe and brake shoe 4 as a reverse shoe when the fluid motor actuates the shoes into engagement with the drum. When the shoes are moved toward engagement with the drum, they will be rotated about anchor pin 17 and there will be no relative movement between the curved surfaces 23 and 24 and 25 and 26 since, during this movement, there will be no force sufficient to cause a sliding movement between these surfaces which are maintained in pressure engagement by the rubber washers. The links will act as part of each shoe in the same manner as if they were permanently secured to the shoe and pivoted on the anchor pin.

When braking takes place there will be produced by shoe 3 a force which is indicated by the letter "N," said force acting directly on the curved surface of abutment 19. This force N is the resultant of the circumferential force acting on the shoe and caused by the drag of the drum on the lining and a second downward force acting on the shoe. In order that the heel end of the shoe will have no tendency to move either toward or away from the drum during the braking action, this resultant force N should at all times be at right angles to a radial line of the drum center which passes through the point where said force is transferred to the abutment member 19. This is accomplished by the construction described, as in such construction the radial line R will be tangent to curved surfaces 23 and 24, the point of tangency coinciding with the point at which the force N acts. This relationship of the force N will always be at right angles to a radial line during intended braking regardless of drum expansion due to heat or lining wear and throughout the working range of the brake shoe.

If the brake shoe 3 should be properly positioned or centered with respect to the drum when it engages the drum, it will will engage the drum over the entire area of the brake shoe lining and without relative movement between the curved surfaces 23 and 24. As intended braking action takes place there will still be no relative movement between these curved surfaces as the force from the self-energizing action of the shoe acts through the surfaces onto the anchor pin and is so great that movement is prevented.

In the event the drum is distorted, the shoe is not properly positioned or centered in the drum, or there has been uneven lining wear by a prior heavy brake application, then when shoe 3 is moved by the fluid motor to engage the drum, there will be no relative movement between the curved surfaces 23 and 24 until the shoe engages the drum. When engagement first takes place, the distorted drum, the uncentered condition of the shoe, or other conditions, will cause the toe of the shoe to become engaged prior to other parts of the shoe lining consequently causing a tendency to establish toe grab. This toe grab, however, will be prevented from developing for as soon as such begins to occur there will be a force established at the toe of the shoe which will act toward the mounted end of the shoe. This force will cause a shifting of the shoe and a relative movement between the curved surfaces. In other words, as soon as the force on the toe of the shoe is great enough to shift the shoe against the friction present between the curved surfaces, the shoe moves and the toe grab will be relieved. As the shoe further engages the drum it will become properly positioned or centered and the entire surface of the lining will then engage the drum. Under additional actuating force the shoe performs its proper braking action and because it is capable of self-centering itself there will be maximum braking torque. After the shoe becomes centered and intended braking action takes place, there will be no additional relative movement of the curved surfaces. The shoe acts then in the same manner as a properly positioned or centered rigid brake shoe mounted directly by its web on a fixed pivot.

When the shoe is properly positioned during braking action, the right angle relationship between the force N and a radial line of the drum will exist since such is always present with the mounting arrangement shown for reasons already pointed out. The relationship thus insures that there will be no force tending to move the heel end of the shoe during braking. Such would not be the case if the surfaces 23 and 24 were flat and the links eliminated as in prior anchor mountings.

When the shoe is centered and intended braking action is taking place, expansion of the drum due to heat will not cause any shifting of the shoe. The same is true as lining wear takes place during braking. However, this lining wear may result in an uneven contour of the lining and when the shoe is released and then subsequently applied, this uneven contour may cause shifting and re-centering of the shoe as the shoe is again engaged.

When the shoe is released from the drum, there will be no relative sliding movement between the curved surfaces 23 and 24 as the friction prevents such and results in the shoe being rotated about the anchor pin in the same manner as a rigid shoe which has its web pivoted directly on the anchor pin.

If there has been expansion of the drum during braking and toe grab has occurred, then after the brake shoe has been released a re-adjustment between the curved surfaces will take place. This will be caused by the contraction of the drum and a wiping action on the heel end of the shoe as the contraction reaches a point where there is contact with the lining. When the shoe is again engaged with the drum there will take place whatever adjustment is necessary to properly position the shoe relatively to the drum for full braking action without toe grab.

From the foregoing it is seen that a brake shoe mounting has been produced which will always permit the shoe to assume a proper position in the drum during braking. Toe grab will be prevented from developing regardless of whether it is caused by the drum distortion, incorrect lining wear, abnormal friction, or any other causes and regardless of whether any or all are present. The proper positioning or centering of the shoe takes place automatically each time the shoe is applied if centering is required. Regardless of what adjustment takes place to center the shoe, there will be no unbalancing force present at the heel end since the force being transmitted to the anchor (force N) always remains at a right angle to a radial line passing through the point at which transfer occurs to the pivoted block on the anchor pin.

When the drum is rotating in the direction opposite that indicated by the arrow, then shoe 4 will become a forward shoe and its mounting will function in the same manner as shoe 3. When either of the shoes is acting as a reverse shoe, the mounting permits the shoe to properly center itself with trespect to the drum as the shoe initially engages the drum. The adjusting, however, is not brought about by any tendency of the toe of the shoe to grab since the shoe acts as a reverse shoe.

From the foregoing description it is apparent that I have devised a very simple and efficient single anchor mounting for two brake shoes wherein either shoe is a self-centering brake shoe. The mounting construction is very compact and the forces acting on the anchor pin by both shoes are always in the same plane.

Being aware of the possibility of modifications in the particular structure herein described without departing from the fundamental principles of my invention, I do not intend that its scope be limited except as set forth in the appended claims.

Having fully described my invention, what I claim as new and desire to secure by Letters Patent of the United States is:

1. In braking mechanism, a support, a brake drum, two brake shoes positioned in the drum and provided with curved abutment surfaces on adjacent heel ends, means for mounting said adjacent heel ends on the support, said mounting means comprising a single anchor pin, abutment members positioned for pivotal movement about the pin and lying in the same plane, said abutment members having curved surfaces for engagement by the curved surfaces on the heel ends of the shoes, a link non-rotatively connected to one abutment member and pivotally connected to the shoe engaged therewith, and a second link non-rotatably connected to the other abutment member and pivotally connected to the shoe engaged therewith.

2. In braking mechanism, a support, a brake drum, two brake shoes positioned in the drum and provided with curved abutment surfaces on adjacent heel ends, means for mounting said adjacent heel ends on the support, said mounting means comprising a single anchor pin, abutment members positioned for pivotal movement about the pin and lying in the same plane, said abutment members having curved surfaces for engagement by the curved surfaces on the shoe ends, a link non-rotatably connected to one abutment member and pivotally connected to the shoe engaged therewith, a second link non-rotatably connected to the other abutment member and pivotally connected to the shoe engaged therewith, and means for maintaining the cooperating curved surfaces of each shoe and its abutment member in pressure engagement.

3. In braking mechanism, a support, a brake drum, two brake shoes positioned in the drum and provided with curved abutment surfaces on adjacent heel ends, means for mounting said adjacent heel ends on the support, said mounting means comprising a single anchor pin, abutment members positioned for pivotal movement about the pin and lying in the same plane, said abutment members having curved surfaces for engagement by the curved surfaces on the heel ends of the shoes, a link non-rotatably connected to one abutment member and pivotally connected to the shoe engaged therewith, a second link non-rotatably connected to the other abutment member and pivotally connected to the shoe engaged therewith, and a member of yieldable material associated with the pivotal connection of each link and shoe for biasing the curved end surface of the shoe into engagement with the cooperating curved surface on the engaged abutment member.

4. In braking mechanism, a support, a brake drum, two brake shoes positioned in the drum and provided with curved abutment surfaces on adjacent heel ends, means for mounting said adjacent heel ends on the support, said mounting means comprising a single anchor pin, abutment members positioned on opposite sides of the pin in the same plane and having recessed portions engaging the pin surface for facilitating pivotal movement about the axis of the pin, each abutment member having a curved surface for engagement by a curved surface on the heel end of an adjacent shoe, a link secured to one side of one abutment member and pivotally connected to the same side of the shoe engaged therewith, and a second link secured to the other abutment member and pivotally connected to the shoe engaged therewith, said second link being positioned on the side of said abutment and shoe opposite that of the first named link.

5. In braking mechanism, a support, a brake drum, two brake shoes positioned in the drum and provided with curved abutment surfaces on adjacent heel ends, means for maintaining said adjacent heel ends on the support, said means comprising a single anchor pin, abutment members positioned on opposite sides of the pin in the same plane and having recessed portions engaging the pin surface for facilitating pivotal movement about the axis of the pin, each abutment member having a curved surface for engagement by a curved surface on the heel end of the adjacent shoe, a link secured to one side of one abutment member and pivotally connected to the same side of the shoe engaged therewith, a second link secured to the other abutment member and pivotally connected to the shoe engaged therewith, said second link being positioned on the side of the said abutment and shoe opposite that of the first named link, and means between each link and the shoe to which it is pivoted for maintaining the curved end surface of the shoe in pressure engagement with the cooperating curved surface of the abutment.

6. In braking mechanism, a support, a brake drum, two brake shoes positioned in the drum and provided with curved abutment surfaces on adjacent heel ends, means for maintaining said adjacent heel ends on the support, said means comprising a single anchor pin, abutment members positioned on opposite sides of the pin in the same plane and having recessed portions engaging the pin surface for facilitating pivotal movement about the axis of the pin, each abutment member having a curved surface for engagement by a curved surface on the heel end of an adjacent shoe, a link secured to one side of one abutment member and pivotally connected to the same side of the shoe engaged therewith, a second link secured to the other abutment member and pivotally connected to the shoe engaged therewith, said second link being positioned on the side of said abutment and shoe opposite that of the first named link, and a rubber washer compressed between each link pivot pin and the shoe to which the link is pivoted for maintaining the curved end surface of the shoe in pressure engagement with the cooperating curved surface on the abutment.

7. In braking mechanism, a support, a brake drum, two brake shoes positioned in the drum and provided with curved abutment surfaces on adjacent heel ends, means for mounting said adjacent heel ends on the support, said mounting means comprising a single anchor pin, abutment members positioned for pivotal movement about the pin axis and lying in the same plane, said abutment members having curved surfaces for engagement by the curved surfaces on the heel ends, two links pivotally connected to opposite sides of one shoe and also pivotally mounted on the anchor pin, one of said links being secured to the abutment member engaged by said shoe, and two links pivotally connected to opposite sides of the other shoe and also pivotally connected on the anchor pin, one of said links being secured to the abutment member engaged by said other shoe.

8. In braking mechanism, a support, a brake drum, two brake shoes positioned in the drum and provided with curved abutment surfaces on adjacent heel ends, means for mounting said adjacent heel ends on the support, said mounting means comprising a single anchor pin, abutment members positioned for pivotal movement about the pin axis and lying in the same plane, said abutment members having curved surfaces for engagement by the curved surfaces on the heel ends, two links pivotally connected to opposite sides of one shoe and also pivotally mounted on the anchor pin, one of said links being secured to the abutment member engaged by said shoe. two links pivotally connected to opposite sides of the other shoe and also pivotally connected on the anchor pin, one of said links being secured to the abutment member engaged by said other shoe, and means for biasing the curved surface of each shoe end in pressure engagement with the surface with which it cooperates.

9. In braking mechanism, a support, a brake drum, two brake shoes positioned in the drum and provided with curved abutment surfaces on adjacent heel ends, means for mounting said adjacent heel ends on the support, said mounting means comprising a single anchor pin, abutment members positioned for pivotal movement about the pin axis and lying in the same plane, said abutment members having curved surfaces for engagement by the curved surfaces on the heel ends, two links pivotally connected to opposite sides of one shoe by a common pin and also pivotally mounted on the anchor pin, one of said links being secured to the abutment member engaged by said shoe. two links pivotally connected to opposite sides of the other shoe by a common pin and also pivotally connected on the anchor pin, one of said links being secured to the abutment member engaged by said other shoe, and a rubber member so associated with each shoe pivot pin for the links that it will bias the shoe into pressure engagement with its abutment member.

10. In braking mechanism, a support, a brake drum, a brake shoe provided with a curved abutment surface on its heel end, means for mounting said heel end on the support, said mounting means comprising an anchor pin, an abutment member positioned for pivotal movement about the pin and having a curved surface for engagement by the curved surface on the heel end of the shoe, a link secured at one end to the abutment member and connected to the shoe by a pivot pin, and a yieldable member compressed between the shoe and the link pivot pin for exerting a force maintaining the curved surfaces in pressure engagement.

11. In braking mechanism, a support, a brake drum, a brake shoe provided with a curved abutment surface on its heel end, means for mounting said heel end on the support, said mounting means comprising an anchor pin, an abutment member positioned for pivotal movement about the pin and having a curved surface for engagement by the curved surface on the heel end of the shoe, a link secured at one end to the abutment member and connected to the shoe by a pivot pin, and a rubber washer surrounding the link pivot pin and so compressed between the pin and shoe when the shoe abutment member and link are assembled that it will cause the cooperating curved surfaces to be maintained in pressure engagement.

12. In a brake device, a supporting element, a brake drum, a pair of brake shoes pivotally supported on said supporting element, means to move said shoes into engagement with said drum, means to retract said shoes from said drum, a pivot pin fixed to said supporting element about which said shoes pivot, means engaging said pivot pin on substantially opposite sides thereof having a curvilinear surface thereon, said shoes provided with curvilinear surfaces complementary to said last mentioned curvilinear surfaces, and link means engageable with said pin and each of said brake shoes to enable said curvilinear surfaces to move relatively of each other to adjust said brake shoes relatively radially of said drum.

13. In a brake device, a backing plate, a brake drum rotatable relatively thereto, a brake shoe disposed within said drum, a pivot pin fixed to said backing plate, an element engaging said pin having a curved surface on one side thereof, said shoe having one end curved complementary to said curved surface, means to keep said surfaces in frictional engagement with each other which includes a link element pivoted to said pin and movable relatively to said shoe, said surfaces moving relatively of each other when said shoe is moved substantially radially of said drum, and a rubber element in said shoe about which one end of said link is movable urging said surfaces into engagement.

14. In a brake device, a backing plate, a brake drum rotatable relatively thereto, a pair of brake shoes disposed within said drum, a pivot pin fixed to said backing plate, a pair of elements disposed on opposite sides of said pin for rotation about said pin, rod elements each having a curvilinear surface, a complementary curvilinear surface formed on one end of each brake shoe, each brake shoe in engagement with one of said curvilinear surfaces, a pair of link means pivoted to said pin and the other end of each of said links respectively pivoted to one of said shoes, and rubber inserts in said shoes in which said other ends of said links are pivoted, said inserts urging and holding said surfaces in frictional engagement, said surfaces movable relatively of each other to adjust said shoe substantially radially of said drum.

15. In a brake device, a backing plate, a brake drum rotatable relatively of said plate, a pair of brake shoes, a pivot pin fixed to said plate, a pair of bearing elements disposed on opposite sides of said pin and rotatable about said pin, each of said elements provided with a curvilinear surface, the end of each of said brake shoes adjacent said pin provided with a curvilinear surface complementary to said first mentioned curvilinear surfaces and in engagement therewith, a pair of links each pivoted at one end thereof to said pin, a rubber insert disposed in each shoe, the other end of each of said links arranged in each of said inserts, said inserts holding each of said complementary surfaces in engagement, means to pivot said shoes about said pin, and each of said complementary surfaces moving relatively of each other about said inserts when said shoes are adjusted substantially radially of said drum.

STEVE SCHNELL.